(12) United States Patent
Zimmer et al.

(10) Patent No.: US 10,590,975 B2
(45) Date of Patent: Mar. 17, 2020

(54) BOLT HOLDING DEVICE AND CONNECTING SYSTEM

(71) Applicants: Martin Zimmer, Rheinau (DE); Guenther Zimmer, Rheinau (DE)

(72) Inventors: Martin Zimmer, Rheinau (DE); Guenther Zimmer, Rheinau (DE)

(*) Notice: Subject to any disclaimer, the term of this patent is extended or adjusted under 35 U.S.C. 154(b) by 308 days.

(21) Appl. No.: 15/807,510

(22) Filed: Nov. 8, 2017

(65) Prior Publication Data

US 2018/0066690 A1    Mar. 8, 2018

Related U.S. Application Data

(63) Continuation-in-part of application No. PCT/DE2016/000195, filed on May 10, 2016.

(30) Foreign Application Priority Data

May 12, 2015    (DE) .................. 10 2015 005 937

(51) Int. Cl.
| | |
|---|---|
| F16B 12/24 | (2006.01) |
| F16B 43/00 | (2006.01) |
| F16B 21/07 | (2006.01) |
| F16B 21/08 | (2006.01) |
| F16B 21/20 | (2006.01) |
| F16B 19/02 | (2006.01) |
| F16B 12/46 | (2006.01) |
| F16B 5/06 | (2006.01) |

(52) U.S. Cl.
CPC ............ *F16B 12/24* (2013.01); *F16B 21/075* (2013.01); *F16B 21/082* (2013.01); *F16B 21/20* (2013.01); *F16B 43/004* (2013.01); *F16B 5/0642* (2013.01); *F16B 12/46* (2013.01); *F16B 19/02* (2013.01)

(58) Field of Classification Search
CPC ........ F16B 21/165; F16B 21/20; F16B 21/075; F16B 13/0833; F16B 13/0858; F16B 12/14; F16B 12/24; F16B 12/26; F16B 19/1081

See application file for complete search history.

(56) References Cited

U.S. PATENT DOCUMENTS

| | | | | |
|---|---|---|---|---|
| 3,007,364 A | * | 11/1961 | Dickie | F16B 29/00 411/15 |
| 4,405,272 A | * | 9/1983 | Wollar | F16B 19/1081 411/41 |

(Continued)

FOREIGN PATENT DOCUMENTS

| | | |
|---|---|---|
| DE | 1 258 664 | 1/1968 |
| DE | 30 36 627 A1 | 5/1982 |

(Continued)

*Primary Examiner* — Daniel J Wiley
(74) *Attorney, Agent, or Firm* — Klaus J. Bach

(57) ABSTRACT

In a bolt holding device with a bolt draw-in arrangement engaging the bolt for joining for example furniture parts, a bolt retaining arrangement is provided which blocks the bolt draw-in arrangement when the bolt is not positioned in the bolt holding device and a release element is associated with the retaining arrangement which can be activated by the insertion of the bolt for drawing the bolt fully into, and locking it in, the bolt holding device.

With the bolt holding device, furniture pieces for example can easily be assembled by an end user without the need for particular tools.

6 Claims, 7 Drawing Sheets

(56) References Cited

U.S. PATENT DOCUMENTS

| | | | | |
|---|---|---|---|---|
| 5,211,519 | A * | 5/1993 | Saito | F16B 19/1081 |
| | | | | 411/45 |
| 5,945,606 | A * | 8/1999 | Tokunaga | B60C 23/04 |
| | | | | 374/E1.018 |
| 6,406,235 | B1 * | 6/2002 | Bantle | F16B 12/14 |
| | | | | 411/41 |
| 6,991,413 | B2 * | 1/2006 | Ballou | F16B 13/063 |
| | | | | 411/15 |
| 7,413,367 | B2 * | 8/2008 | Hawang | F16B 19/1081 |
| | | | | 403/297 |
| 7,837,408 | B2 * | 11/2010 | Hawang | F16B 13/0816 |
| | | | | 403/243 |
| 9,771,964 | B2 * | 9/2017 | Leveen | F16B 12/10 |
| 10,443,633 | B2 * | 10/2019 | Scherer | F16B 1/0071 |
| 2010/0011696 | A1 * | 1/2010 | Zimmer | A47B 95/02 |
| | | | | 52/698 |
| 2019/0195258 | A1 * | 6/2019 | Zimmer | F16B 12/24 |

FOREIGN PATENT DOCUMENTS

| | | |
|---|---|---|
| DE | 10 2008 047 041 A1 | 3/2010 |
| EP | 1 406 022 A1 | 4/2004 |

* cited by examiner

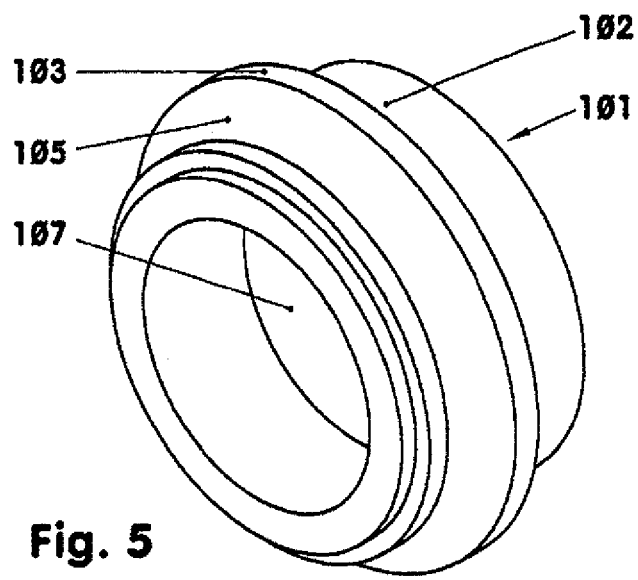
Fig. 5
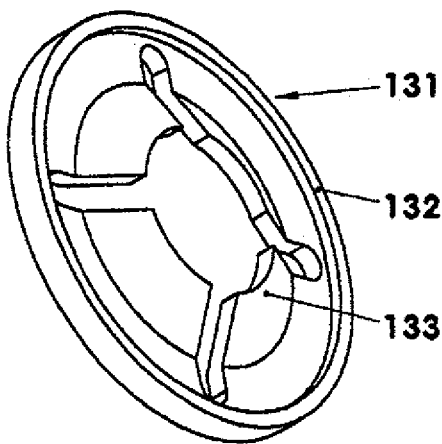
Fig. 6
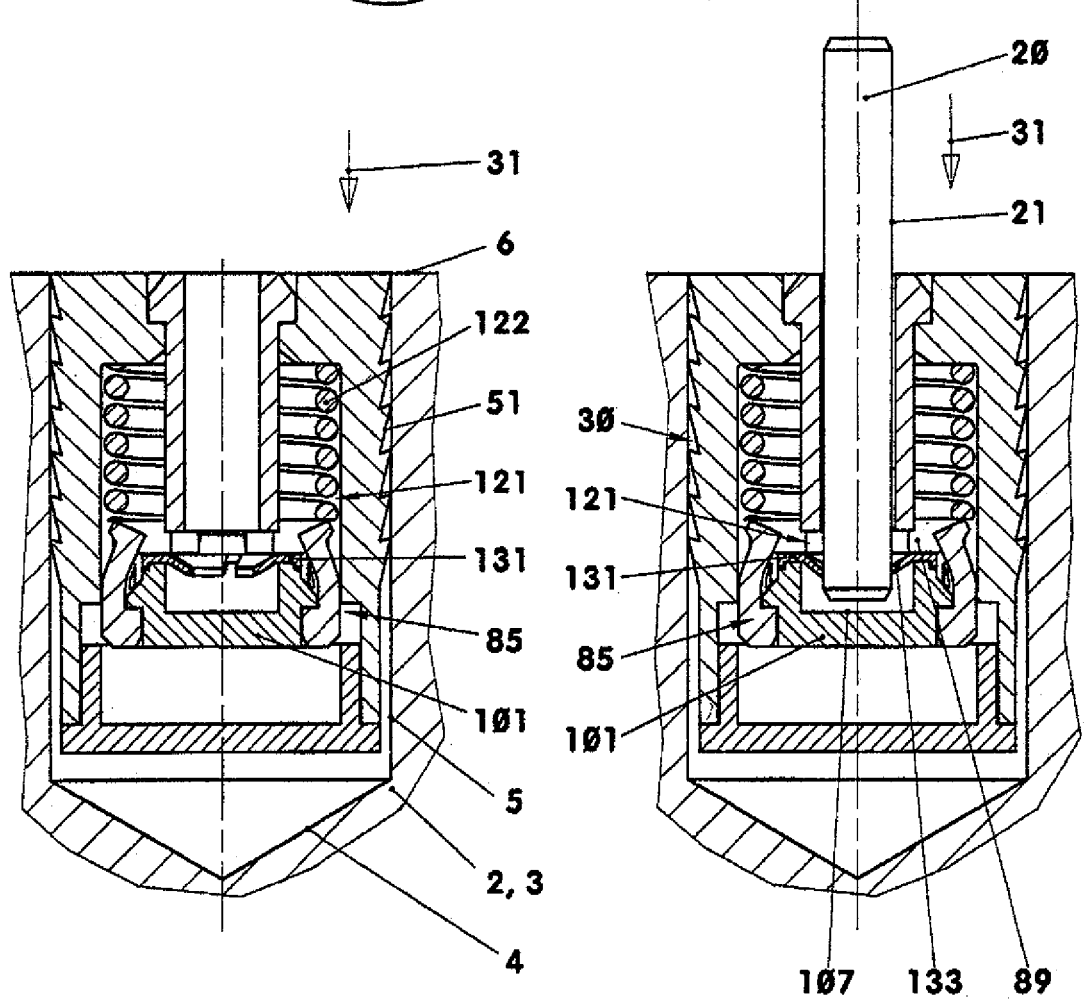
Fig. 7
Fig. 8

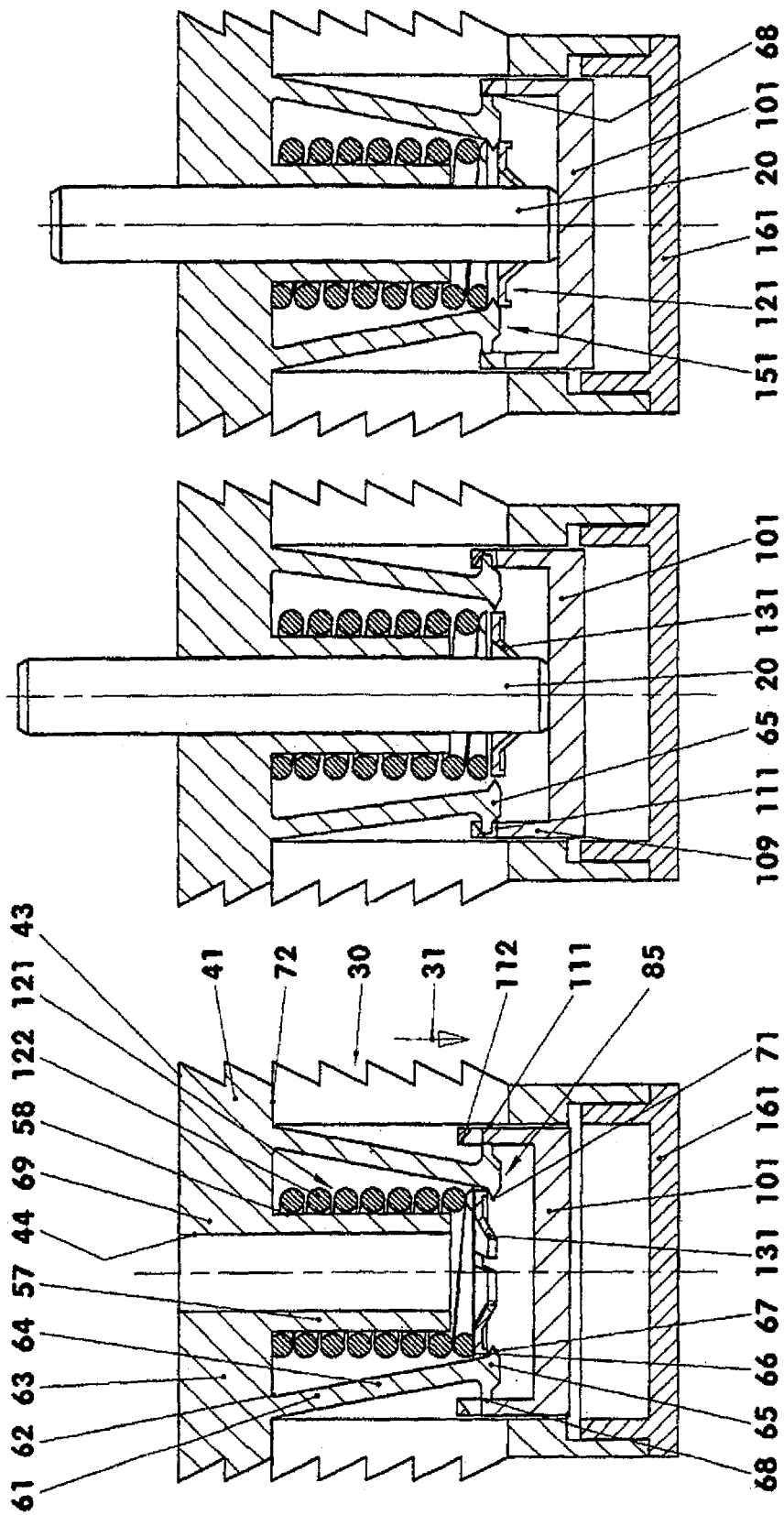

BOLT HOLDING DEVICE AND CONNECTING SYSTEM

This is a continuation-in-part patent application of pending international patent application PCT/DE2016/000195 filed 2016 May 10 and claiming the priority of German patent application 10 2015 005 937.8 filed 2015 May 12.

BACKGROUND OF THE INVENTION

The invention resides in a bolt holding device with a bolt draw-in device for fastening a bolt, a system with two such bolt holding devices and also to a furniture piece with two furniture parts and a connecting system for interconnecting the two furniture parts.

EP 1 406 022 A1 discloses as bolt holding arrangement in which a bolt is held in position by being clamped between two spring sheets which extend obliquely with respect to the axis of the bolt and additionally by a bayonet locking structure. The spring sheets can be mounted only in a hollow space. For the installation of the bolt, a tool is needed for turning the bolt around its longitudinal axis.

It is the object of the present invention to provide a bolt holding device which permits rapid and problem-free installation for final mounting of a bolt essentially without any tools and a connecting system with two such bolt holding devices.

SUMMARY OF THE INVENTION

In a bolt holding device with a bolt draw-in arrangement engaging the bolt for joining for example furniture parts, a bolt retaining arrangement is provided in the bolt holding device which blocks the bolt draw-in arrangement as long as the bolt is not yet in position in the bolt holding device and a release element is associated with the bolt retaining arrangement which can be activated by the insertion of the bolt for drawing the bolt fully into, and locking it in, the bolt holding device.

With the bolt holding device, furniture pieces for example can easily be assembled by an end user without the need for particular tools.

In the system with two such bolt holding devices the bolt the two bolt holding devices are oriented in opposite directions. For forming a connecting system, a cylindrical bolt without thread is to be inserted into both bolt holding devices and fixed therein so as to interconnect two furniture parts.

The furniture piece comprises two furniture parts which are interconnected by means of a connecting system. The connecting system comprises two bolt holding devices and a bolt inserted into the two bolt holding device.

Further particulars of the invention will become more readily apparent from the following description of schematically represented embodiments.

BRIEF DESCRIPTION OF THE DRAWINGS

It is shown in:
FIG. 5: a stop-lid;
FIG. 6 a clamping disc;
FIG. 7: a bolt-holding device in a furniture part;
FIG. 8: a bolt-holding device with a bolt inserted therein;
FIG. 16: a variant of a bolt-holding device;
FIG. 17: a bolt-holding device as shown in FIG. 16 with a bolt drawn in;
and
FIG. 18: a bolt holding device as shown in FIG. 16 with activated pull-out prevention.

FIG. 1 shows a bolt holding device 30. With such a bolt holding device 30 for example, cylindrical bolts 20, which are not provided with threads are securely retained.

DESCRIPTION OF PARTICULAR EMBODIMENTS OF THE INVENTION

Figure 1:
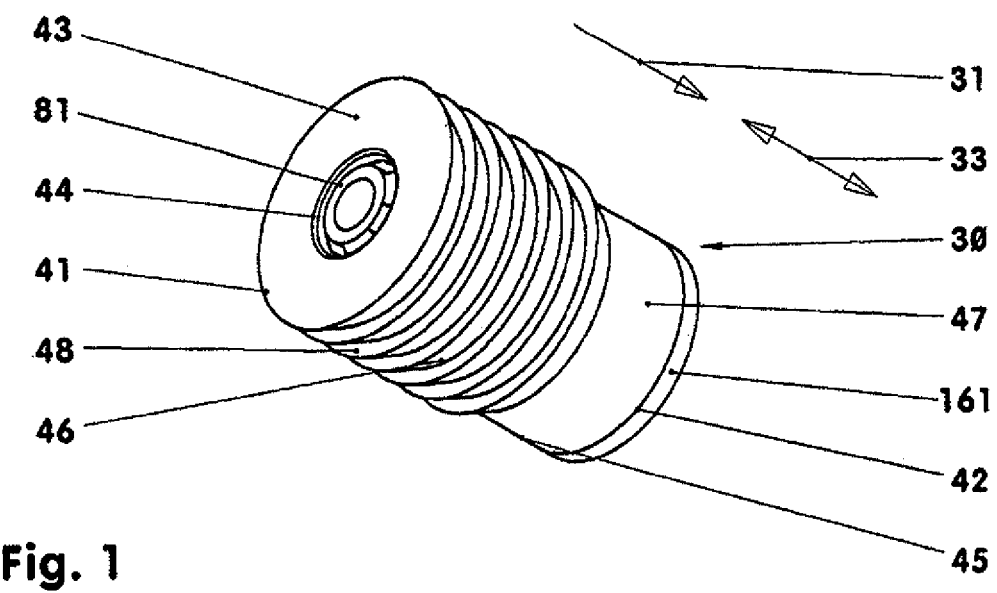
FIG. 1: a bolt holding device.

The bolt holding device 30 comprises an insert sleeve 41 which is closed at its back side by a protective lid 161. The protective lid 161 is in the form of an insert lid, which, with its backside 42, abuts the insert sleeve 41. At its front side 43 facing the viewer in FIG. 1, there is an insert opening 44 of the insert sleeve 41 in which a retaining and guide element is arranged. An arrow 31 indicates the bolt insert direction from the front side 43 toward the protective lid 161. The bolt insert direction 31 is oriented in the longitudinal direction 33 of the bolt holding device 30.

The insert sleeve 41 has an annularly-shaped cross-sectional surface. The outer surface 45 comprises a support section 46 which is formed step-like adjacent the front side 43 and a cylindrical guide section 47 adjacent the protective lid 161. The length of the support section 46 is for example 70% of the length of the insert sleeve 41.

Figure 2:
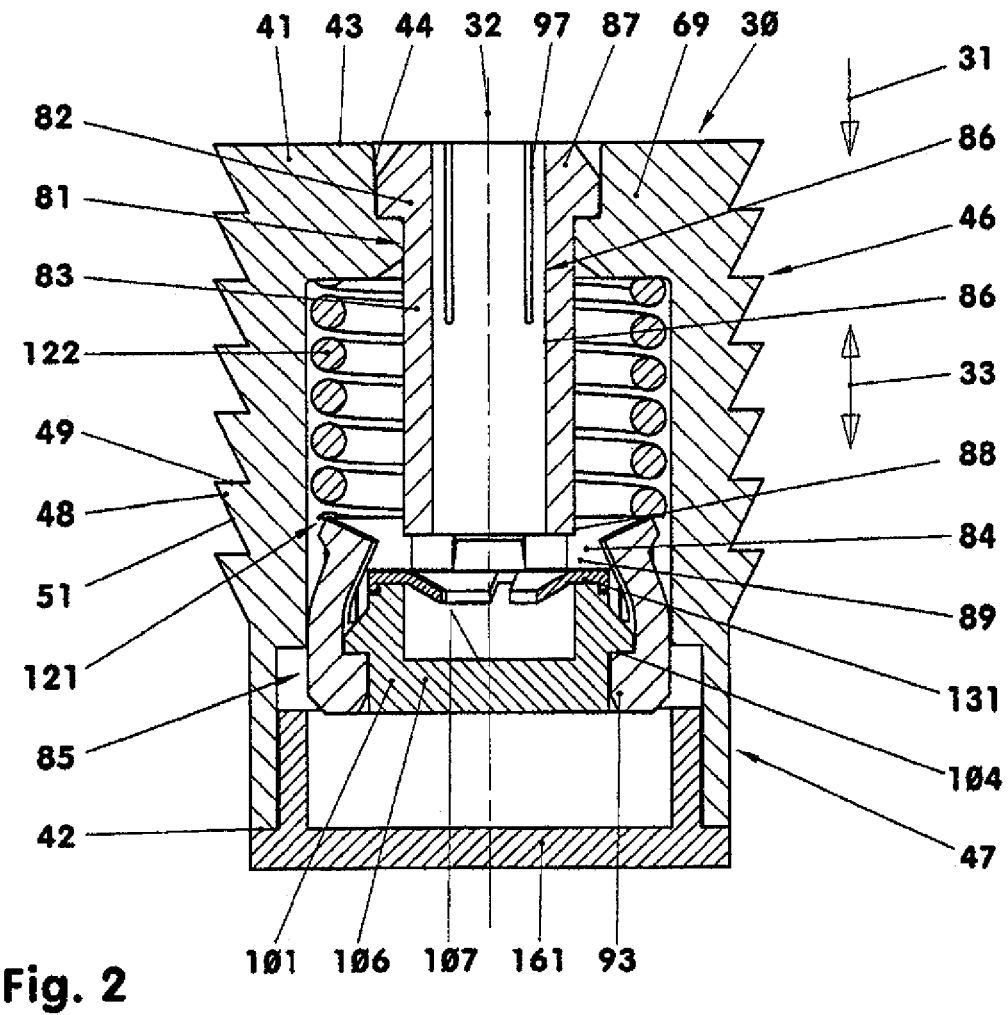
FIG. 2: the bolt holding device in a longitudinal cross-sectional view of FIG. 1.

FIG. 2 shows a longitudinal cross-sectional view of the bolt holding device 30 shown in FIG. 1. The support section 46 is provided with annular engagement projections 48 which are arranged co-axially with the center line 32 of the bolt holding device 30. In the exemplary embodiment, the insert sleeve 41 has seven equidistantly arranged engagement projections 48, which all have the same triangular cross-section. They have a support surface 49 which extends normal to the bolt insert direction 31 and a slide surface 51 which narrows down in the bolt insert direction 31 and is truncated cone-shaped. The lip angle of the slide surface 51 is for example 54 degrees. The outer diameter of the support section 46 is in the representation of FIGS. 1 and 2 greater than the outer diameter of the guide section 47 by 14%. The support surfaces 49 may also be a truncated cone-shaped wherein the cone would point in the same direction as the cone of the slide surfaces 51. The annular engagement projections 48 may also be interrupted. And it is also possible to provide the support sections 46 in a spiral-shaped structure.

Figure 3:
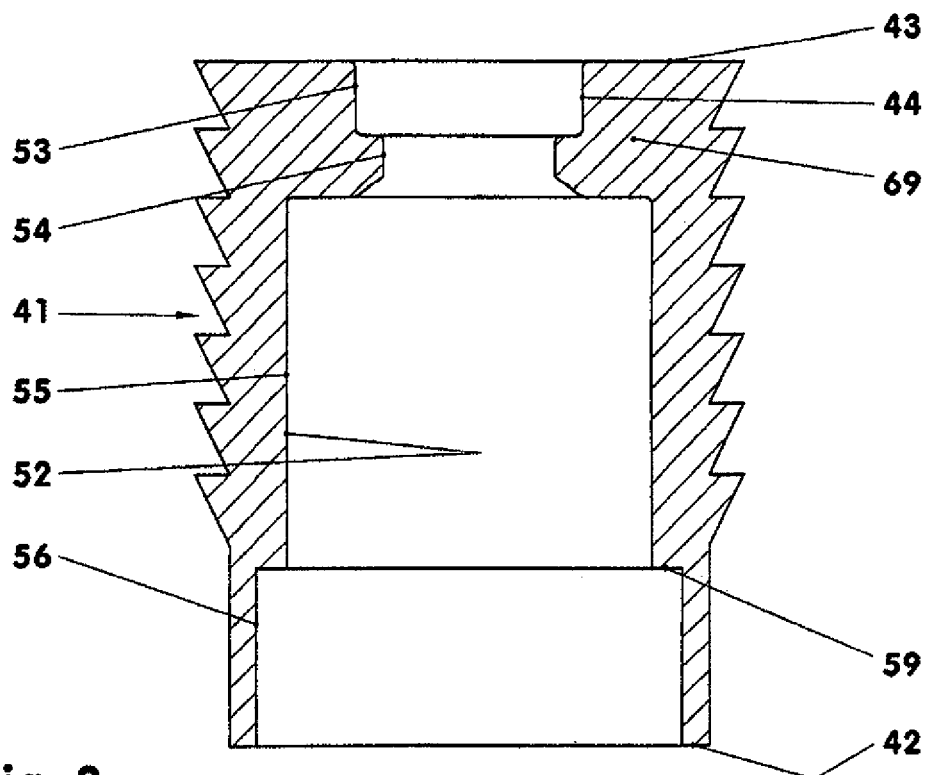
FIG. 3: an insert sleeve.

FIG. 3 shows a longitudinal cross-sectional view of the insert sleeve 41. The insert sleeve 41 is pot-shaped with a bottom 69 provided at the front side 43. There is an insert opening 44 from which the inner wall 52 of the insert sleeve 41 extends. It has for example four sections 53, 55-56 of different internal diameters. At the front side 43, there is an accommodation section. Its diameter is in the exemplary embodiment 41% of the outer diameter of the support section 46. The length of the accommodation section 53 is for example 11% of the length of the insert sleeve 41.

Following the accommodation section 53, there is a central passage 54. Its diameter is in the exemplary embodiment 31% of the outer diameter of the support section 46 and its length is 31% of the length of the insert sleeve 41.

The diameter of the spring seat section 55, which follows the passage 54, is in the insert sleeve 41—as shown in the FIGS. 1-3—66% of the maximum outer diameter of the insert sleeve 41. In the longitudinal direction 33, the length of the spring seat section 55 is in the exemplary embodiment 54% of the length of the insert sleeve 41.

Between the spring seat section 55 and the backside 47 remote from the front side 42, there is a securing section 56. The diameter of this securing section 56 is 77% of the outer diameter of the support section 46.

The insert sleeve 41 consists for example of a thermoplastic material. But it may also be manufactured from a metallic material such as steel, cast iron or aluminum. In the exemplary embodiment, the insert sleeve 41 is formed as an integral part. However, the insert sleeve 41 may also comprise two parts. It then has a separating area oriented in the longitudinal direction 33. In this separating area, form-locking elements may be provided for centering the for example identical halves of the insert sleeve 41. Additionally, the two halves may be joined by forced engagement or by a material for example by means of a cement.

Figure 4:
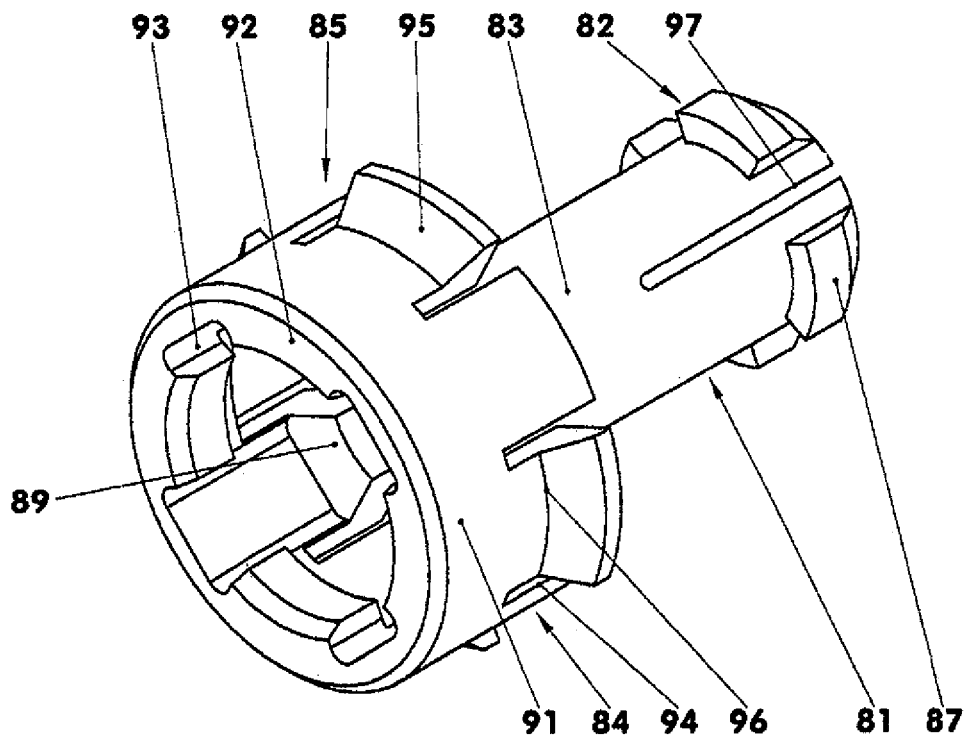
FIG. 4: a draw-in and guide element.

In the representations of FIGS. 1 and 2, a retaining and guide element 81 is present. FIG. 4 shows such a retaining- and guide element 81 before installation. The retaining- and guide element 81 is manufactured for example from the same material as the insert sleeve 41.

The retaining and guide element 81 comprises a support area 82, a guide area 83, a support arrangement 84 and a retaining arrangement 85. In the exemplary embodiment, the retaining and guide element 81 includes a longitudinal central bore 86 which is oriented in the longitudinal direction 86.

The support area 82 of the retaining and guide element 82 is arranged in the accommodation section 53 of the insert sleeve 41. The support area 82 has individual support elements 87 which are shown in FIG. 2 to be flush with the front side 43 of the insert sleeve 41. The support area 82 for example is narrowed down toward the front side 43.

The guide area 83 is in the exemplary embodiment a cylindrical tube through which the longitudinal bore 86 extends. Its internal diameter which remains constant over its full length is for example 21% of the outer diameter of the support section 46. Its outer diameter is for example so selected that the guide area 83 is disposed in the passage 54 of the insert sleeve 41 with some play or with a transition fit. The length of the guide area 83 is for example 57% of the length of the insert sleeve 41.

In the support area 82 and in the guide area 83, the retaining and guide element 81 has for example four longitudinal slots 97. They have a length of for example two thirds of the length of the guide section 83. But it is also possible to omit any longitudinal slots 97 for example with the use of a two-part insertion sleeve 41.

At the end of the insertion sleeve remote from the front side 43, there is the support arrangement 84. The support arrangement 84 is connected to the guide area 83 by means of a shear connection 88. The shear surfaces between the guide area 83 and the support arrangement 84 have for example sharp edges and a small cross-sectional area.

The support arrangement 84 has the form of a pot. The support bottom of the pot is disposed on the guide area 83. In addition, it extends around the guide area 83 and is fixed thereto by means of shear connections 88. Herein, the support bottom 89 as well as the guide area 83 are rigid with regard to a load applied in the longitudinal direction 33.

The jacket 91 next to the support bottom 89 extends co-axially with the center line 32 in a direction away from the front side 43. At its circumferential edge 92 spaced from the support bottom 89, it is provided for example with four holding elements oriented toward the center line 32. The jacket 91 has openings 94 which are provided with pull-out prevention elements 95. The connection of the pull out prevention elements 95 to the edge 92 are in the form of elastic material joints 96. In the unstressed position as shown in FIG. 4, the pull-out prevention elements 95 project outwardly. They extend with respect to the longitudinal direction 33 for example at an angle of 45 degrees whereby they project outwardly from the edge 92. The support arrangement 84 may also be provided without such pull-out prevention elements.

In the installation position as shown in FIG. 2, the elastic material joints 96 are deformed. The pull-out prevention elements 95 abut the inner wall of the spring seat section 55.

The holding elements 93 of the retaining and guide element support in the representation of FIG. 2 a stop lid 101. FIG. 5 shows the stop lid 101 as individual part. The stop lid 101 has a circular cross-sectional area which extends normal to the longitudinal direction 33. At its outer circumferential area 102, an annular ring structure 103 is provided which includes, opposite the front side 43, a planar resting surface 104 and, facing the front side 43, a conically-shaped slide surface 105. At the side facing away from the front side 43, the stop lid 101 is delimited by means of a stop disc 106 forming a stop bottom. The stop disc 106 has for example a constant thickness of 7.5% of the length of the insert sleeve 41. The inner side of the stop disc 106 forms a stop surface 107. The insert sleeve 41 further includes a spring energy store 122. In FIG. 2, this is shown as a coil spring 122 in the form of a compression spring. It is supported—pre-tensioned—on the bottom 69 of the insert sleeve 41 and on the support bottom 89 of the retaining and guide element 81. The spring force is for example 170 Newtons. Instead of a coil spring, the spring energy store 122 may also be in the form of a plate spring packet, an elastomer body etc. The spring energy store 122 may also comprise several spring elements.

Between the retaining and guide element 81 and the stop lid 101, there is a clamping disc 131. FIG. 6 shows such a clamping disc 131. The clamping disc 131 is an annular arched spring disc. It includes a support ring 132 from which for example four nose-like clamping elements 133 project inwardly. The inner diameter of the spring disc delimited by the clamping elements 133 is for example 75-99% of the nominal diameter of the clamping spring disc 131. The nominal diameter of the spring disc 131 is the outer diameter of a bolt 20 to be inserted into the spring disc 131. The outer diameter of the spring disc 131 is for example 1.5-6.5 times the size of the nominal diameter. The overall height of the spring disc 131 is between 12% and 81% of the nominal diameter. The material thickness is for example 15.5% of the overall height. The spring disc 131 consists for example of a spring steel which may be austenitic. Instead of the spring disc 131 shown, also a disc May be used which extends conically with respect to a normal of the longitudinal axis at an angle of between 0.5 degrees and 15 degrees.

During the assembly of the bolt holding device 30 for example first, the spring clamping disc 131 and the stop lid 101 are placed onto the retaining and guide element 81. Then the compression spring 122 is placed over the guide area 83 and compressed. This pre-installation unit is pushed from the backside 42 into the insert sleeve 41 while elastically deforming the pull-out prevention elements 95 and the support area 82 so that the pull-out prevention elements 95 abut the inner wall of the spring seat section 55. Then the insert sleeve 41 can be closed by the protective lid 161.

For the insertion of a two-part insert sleeve 41, the pre-installation unit is placed into a curved part of the insert sleeve 41, which is then closed by the second curved part.

In the bolt-holding device 30, pre-assembled in this way, the spring energy store 30 forms, together with the clamping disc 131, a bolt draw-in arrangement 121. The bolt draw-in arrangement is effective in the bolt insert direction 31, which below will also be called bolt draw-in direction 31. The bolt draw-in arrangement 121 is blocked by a retaining arrangement 85. In this way, the retaining and guide element 81 with its support arrangement 84 prevents a relaxation of the spring energy store 122. The stop lid 101 is connected to the retaining arrangement 85 in a form-locking manner.

FIG. 7 shows the bolt holding device 30 disposed in a dead end bore 4 of a furniture piece part 2, 3, which consists for example of wood. The slide surfaces 51 of the annular engagement projections 48 abut partly the wall 5 of the dead end bore 4. The annular engagement projections 48 are hooked into the wood so as to prevent the bolt holding device 30 from being pulled out. It is also possible to provide an additional force- and/or form-locking engagement of the bolt holding device 30 in the furniture part 2, 3. The bolt holding device 30 may additionally be cemented into the furniture part 2, 3. After the insertion of the bolt holding device 30 into the furniture part 2, 3, the front side 43 may be for example flush with a surface 6 of the furniture part 2, 3.

In FIG. 8, the bolt holding device of FIG. 7 is shown with a partially inserted bolt 20. The bolt 20 is a threadless bolt which is shown in the exemplary embodiment without grooves. The bolt 20 shown is a cylindrical bolt. However, the bolt 20 may also be conical or slimmed in an area. The bolt may consist of steel, aluminum, wood, plastic or another material. The elasticity module of the bolt material may correspond to the elasticity module of the insert sleeve 41 and/or the retaining—and guide element 81.

The bolt 20 as shown in FIG. 8 extends in the shown partial installation state through the clamping disc 131 whose clamping elements 133 are deformed in the bolt insert direction 31. The clamping segments 133 abut tightly the outer surface 21 of the bolt 20. As a result, they prevent the bolt 20 from being retracted relative to the clamping disc 31, which abuts the support bottom 89 of the retaining and guide element 82. A displacement of the clamping disc 133 in the bolt insert direction 31 is prevented by the stop lid 101 which is supported by the holding elements 93 of the retaining and guide element 81. Upon insertion, the bolt 20 may also widen the insert sleeve 41. The bolt 20 may then have for example a conical or double conical shape. The circumference of the insert sleeve 41 is then increased during the insertion of the bolt 20, so that the insert sleeve 41 is also anchored in the wood.

Upon further insertion of the bolt 20, the clamping elements slide further along the outer surface 21 of the bolt 20. The bolt is inserted essentially with a constant force until it abuts the stop surface 107 of the stop lid 101. At this point, the resistance to a further insertion of the bolt 21 into the bolt holding device 30 increases.

Upon further insertion or pressing of the bolt 20 against this resistance, the bolt 20 displaces the deformation resistant stop lid 101 relative to the insert sleeve 41. The stop lid 101 transmits the force to the support arrangement 84 of the retaining and guide element 81 in the bolt of the retaining and guide element 81 in the bolt insert direction 31 while the guide area 83 is held in its position by way of the support area 82. The shear connections 88 are separated by this force. The guide area 83 remains in its position relative to the insert sleeve 41. The support arrangement 84 is moved by the bolt 20 and the stop lid 101 in the bolt insertion direction 31. The separation of the retaining arrangement 85 unblocks the bolt draw-in arrangement 121. The spring energy store 122 supports the inward movement of the bolt 20 in the bolt insert direction 31.

The support arrangement 84 which supports the clamping disc 131 is moved by the bolt 20 in the insert direction 31, further relative to the insert sleeve 41. As soon as the pull out prevention elements 95 reach the securing section 56, they are deformed suddenly elastically toward their original position as shown in FIG. 4—and abut the inner wall of the securing section 56.

Figure 9:
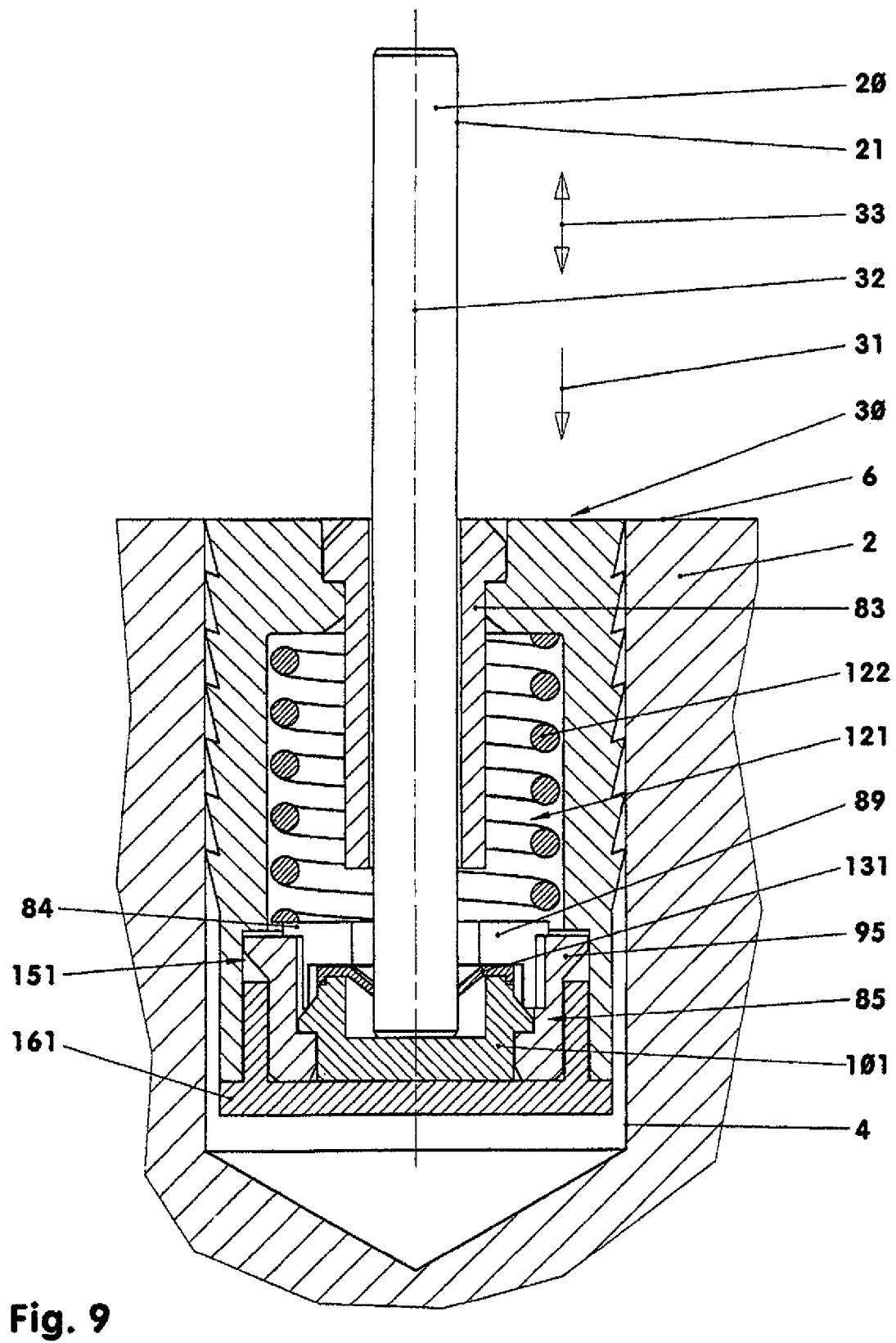
FIG. 9: a bolt-holding device with the bolt secured therein.

FIG. 9 shows the bolt holding device 30 with a fully inserted secured bolt 20. With a force applied to the bolt 20 in a direction opposite to the bolt insert direction 31, the pull-out prevention elements 95 engage the transition area 59 between the securing section 56 and the spring seat section 55. The transition area 59 forms together with the pull-out prevention element 95 a pull-out prevention arrangement 151. With a force on the bolt 20 in a direction opposite to the insert direction 31, the bolt is blocked. The spring energy store 122 is not subjected to additional forces.

The bolt holding device 30 may be installed by a furniture manufacturer without problems into a through bore or into a dead end bore 4. During assembly of the furniture piece, the end customer can secure the bolt 20 in the bolt holding device 30 without the need for tools.

Figure 10:
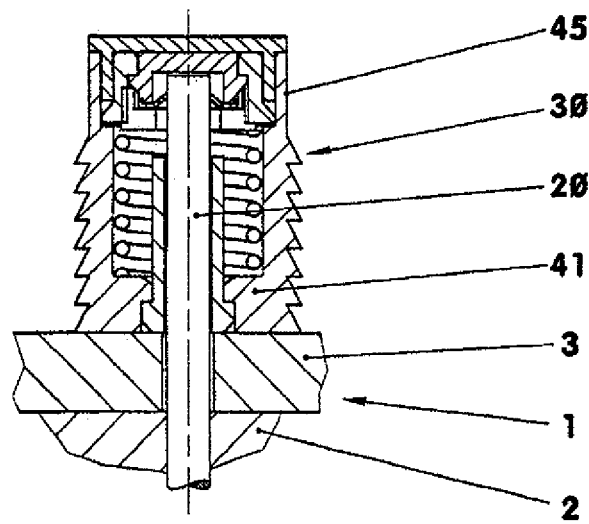
FIG. 10: a bolt-holding device in the form of a bolt-securing arrangement.

FIG. 10 shows a bolt holding device 30 in which a free end of a bolt 20 is secured. The bolt 20 is for example firmly installed in a first furniture part 2 of a piece of furniture 1. On the first furniture part 2, a second furniture part 3 is disposed, for example a board which is mounted by means of the bolt 20 and the bolt holding device 30. In this exemplary embodiment, the insert sleeve 41 may have a cylindrical outer surface 45 without a support section 46. The bolt 20 is securely held in the bolt holding device 30 as it is described in connection with the first exemplary embodiment.

Figure 11:
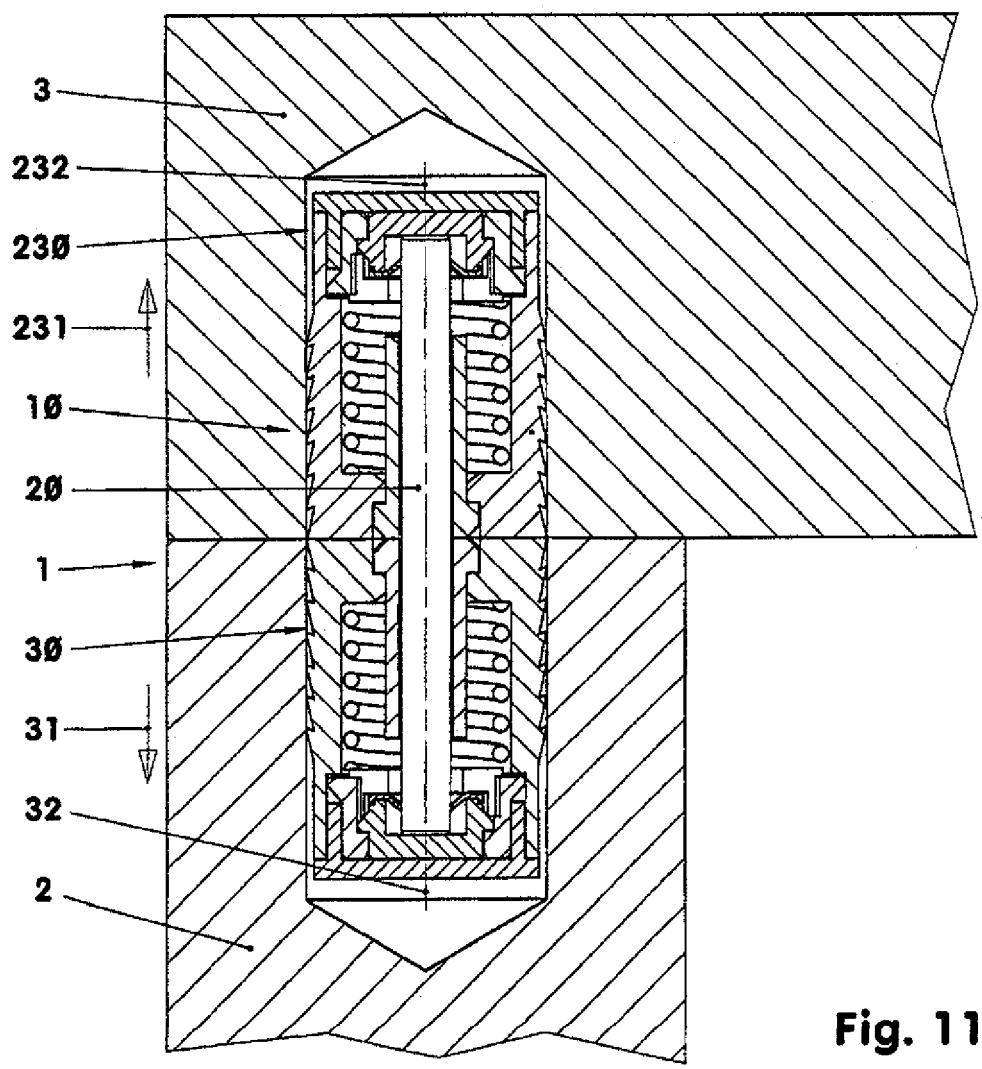
FIG. 11: a connecting system with two bolt holding arrangements.

FIG. 11 shows an interconnecting system 10 with two bolt holding devices 30, 230 and a common interconnection bolt 20 in a furniture piece 1. This furniture piece 1 has two furniture parts 2, 3 which are joined by means of the interconnecting system 10. Both bolt holding devices 30, 230 are of identical design. The design corresponds for example to that shown and described in connection with FIGS. 1-9. In case, one bolt holding device 30, 230 is arranged in a furniture part 2, 3. The bolt 20 is of the same design as the bolt 20 described in connection with FIG. 8.

For the assembly of the furniture piece 1, first the bolt holding devices 20, 320 are installed for example by the manufacturer—like anchors—into the furniture parts 2, 3. This is done for example using a hand tool such as a hammer or a machine. The customer inserts the bolt 20 first into one of the bolt holding device 30, 230. It is sufficient if he inserts the bolt 20 to the point as shown for example in FIG. 8. For joining the first furniture part prepared in this way with the second furniture part 3, 2, the second furniture part is so placed that the bolt 20 points toward the center line 232 of the second bolt holding device 230. Upon joining the two furniture parts 2, 3, the bolt 20 is locked in both bolt holding devices 30, 320 as shown in FIG. 11. The two furniture parts 2, 3 are now unreleasably interconnected.

FIGS. 12-15 show various variants of bolt holding devices 30 with differently formed pull-out prevention arrangements. In these exemplary embodiments, the respective spring energy store 122 is not shown.

Figure 12:
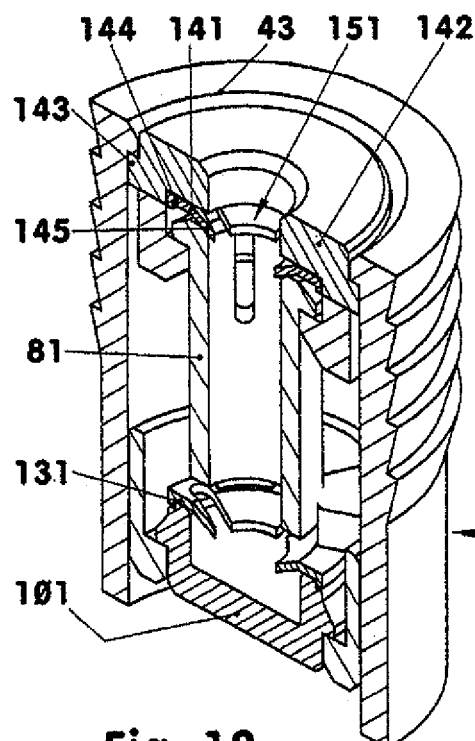
FIG. 12: a bolt holding device with additional pull-out prevention.

The bolt holding device 30 shown in FIG. 12 is largely of the same design as the one shown in FIGS. 1-9. The retaining and guide element 81 is supported with its front end on a second clamping disc 141. This second clamping disc 141 is oriented in the same direction as the first clamping disc 131 which is supported by the stop lid 101. Adjacent the front side 43, a holding ring 142 is provided in the insert sleeve 41. The holding ring has an annular projection 143 by which it is engaged with the insert sleeve 41. The annular projection 143 may also be welded to the insert sleeve 41.

During insertion into the bolt holding device 30, the bolt 20 deforms the second clamping disc 141 as well as the first clamping disc 131. Both clamping discs 131, 141 prevent movement of the bolt 20 relative to the insert sleeve A1 in a direction opposite the insert direction 31.

When the bolt 20 displaces, the stop lid 101, the shear webs 88 are ripped off. The expanding compression spring 122—not shown here—moves the first clamping disc 131 and the bolt 20 in the bolt insert direction 31, that is, the bolt is pulled further into the bolt insert direction 31 so that the bolt is pulled into the bolt holding device 30. The second clamping disc 141 acting as a pull-out prevention 151, continues to prevent movement of the bolt 20 in a direction opposite to the insert direction 31 relative to the insertion sleeve 41. The bolt is fixed in this way in the insert sleeve 41.

Figure 13:
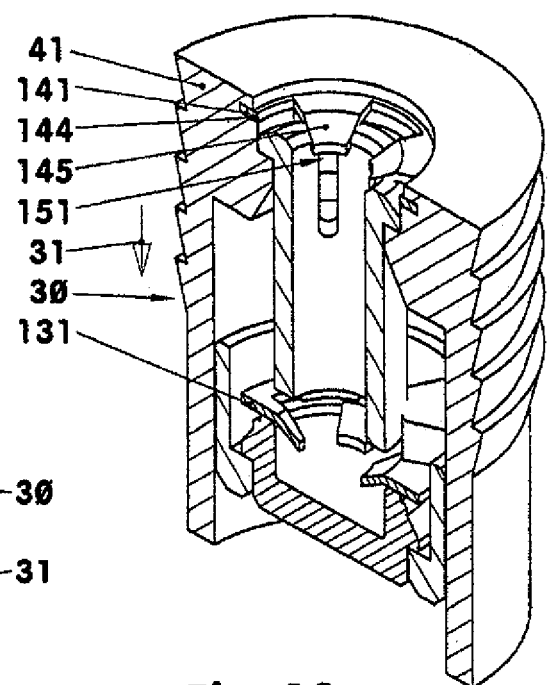
FIG. 13: a bolt holding device with integrated pull-out prevention.

Also in the bolt holding device 30 shown in FIG. 13, there is a second clamping disc 141. This second clamping disc 141 is formed integrally with the insert sleeve 41. It is formed for example already during the manufacture of the insert sleeve 41 by an injection molding process.

The operation of the second clamping disc 141 in the bolt holding device of FIG. 13 is identical to the operation of the second clamping device 141 as described in connection with FIG. 12.

Figure 14:
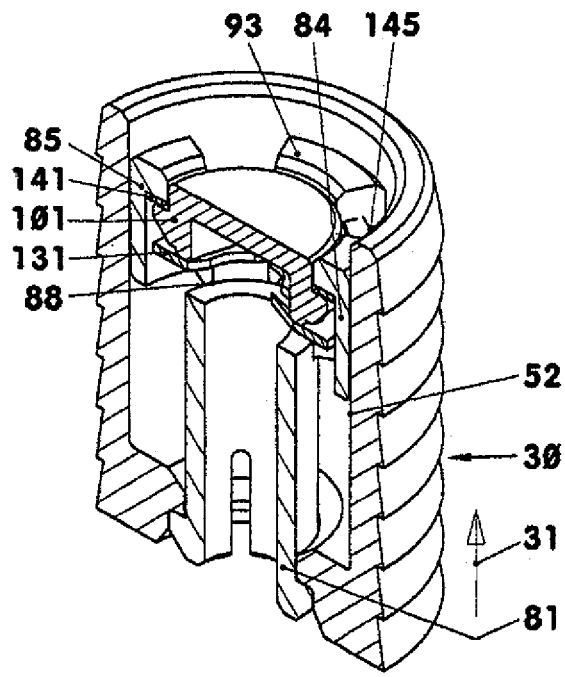
FIG. 14: a bolt-holding device with pull-out prevention provided on the insert sleeve.

FIG. 14 also shows a bolt holding device 30 with a pull-out prevention arrangement 151. In this exemplary embodiment, the pull-out prevention arrangement 151 includes a second clamping disc 141 in the form of a toothed ring 141. The toothed ring 141 comprises for example an inner support ring 144 provided with tooth-like clamping elements 145 projecting outwardly from the support ring 144. These clamping elements 145 are oriented against the bolt insert direction 31 and abut the inner wall 52 of the insert sleeve 41. The clamping disc 141 is arranged between the stop lid 101 and the holding elements 93. The insert sleeve 41 may also be manufactured from an injection molding material. It is also possible that the clamping disc 141 is fixed to the insertion sleeve 41 and its teeth project inwardly. Then the teeth are oriented in the bolt insert direction 31.

During assembly for example, first, the spring energy store 122 is inserted into the insert sleeve 41. The first clamping disc 131, the stop lid 101 and the second clamping disc 141 are inserted into the support arrangement 84 of the retaining and guide element 81 and locked therein. After their insertion, the holding elements 93 of the support arrangement extend over the second clamping element 141 and the stop lid 101 so that they are held in their positions. The whole retaining and guide element 81 is now installed in the insert sleeve using for example a mounting tool which engages the clamping segments 145 of the second clamping disc 141, so that the clamping segments 145 of the second clamping disc 141 point in a direction opposite the bolt insert direction 31. The support ring 144 of the second clamping disc 141 may also be slotted. Also an insert sleeve 41 consisting of two half shells may be used.

The bolt 20 which, during insertion after the separation of the retaining arrangement 85, displaces the stop lid 101, displaces also the support arrangement 84 relative to the insert sleeve 41. The first clamping disc 131 prevents a displacement of the bolt in a direction opposite to the bolt insert direction 31 relative to the support arrangement 84. The second clamping disc 141 blocks movement of the support arrangement 84 in a direction opposite the insert direction 31 relative to the insert sleeve 41. In this way, a removal of the bolt 20 out of the bolt holding device 30 is effectively prevented.

Figure 15:
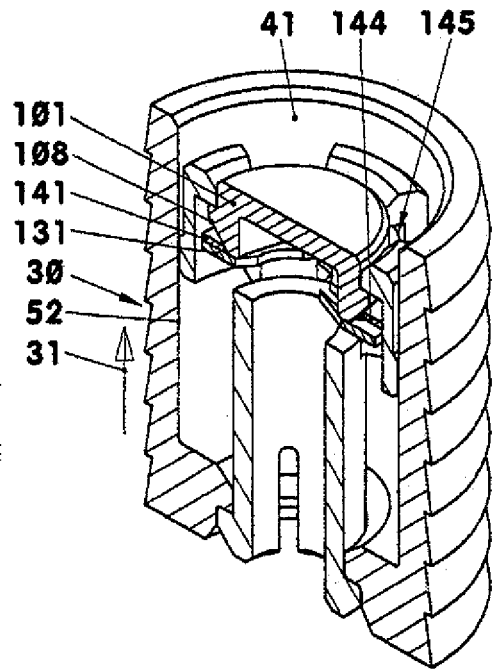
FIG. 15: a bolt-holding device with adjacent clamping discs.

FIG. 15 shows a bolt holding device 30 whose pull-out prevention arrangement 151 also includes a first clamping disc 131 and a second clamping disc 141. The first clamping disc 131 is formed and arranged as described in connection with the previous exemplary embodiment. The second clamping disc 141 is in this exemplary embodiment disposed directly on top of the first clamping disc 131. Their clamping segments 145 project outwardly and abut the inner wall 52 of the insert sleeve 41. In the exemplary embodiment, they point in a direction opposite the bolt insertion direction.

The second clamping disc 141 has in the exemplary embodiment, a slotted support ring 144 so that the second clamping ring 141 can be compressed during assembly. The stop lid 101 is provided with a cone 108 which spreads out the second clamping disc 141 during locking in the support arrangement 80. The assembly is accomplished for example as described in connection with the previous exemplary embodiment.

The first clamping disc 131 can be formed integrally with the second clamping disc 141. During arresting of the bolt 20, the inner clamping elements 133 are connected to the bolt 20 in a force- and/or form-locking manner. The outer clamping elements 145 abut the inner wall 52 of the insert sleeve 41 in a force- and/or form-locking manner.

FIG. 16 shows another variant of a bolt-holding device 30. The insert sleeve 41 is a single-piece part. The front side 43 is closed except for an insert opening 44. The insert opening is surrounded by a guide tube 57 whose outer surface 58 guides the spring energy store 122.

In the wall openings 72 of the insert sleeve 41, there are flexible webs 61 whose free ends extend into the bolt insert direction when not engaged. These flexible webs 61 are connected to a ring section 63 of the insert sleeve 41 for example by elastically deformable joint areas 62. In the exemplary embodiment, the insert sleeve 41 includes for example two flexible webs 61; but it may include three or more flexible webs 61.

The individual flexible web 61 is provided adjacent the flexible joint area 62 with a bending section 64. Its free end forms a support head 65. The support head 65 has a triangular shape in the representation of FIG. 16. Its surface facing in this representation toward the insert opening 44 is a support surface 66. Adjacent the support surface 66, there is a slide surface 67. The rear side of the flexible web 61 facing away from the centerline 32 forms a securing surface area 68 which includes for example an engagement projection. The insert sleeve 41 further include a stop lid 101. The stop lid 101 includes a stop bottom which forms a stop disc 106 and has a high rigidity so as not to be deformable. The outer surface 109 of the stop lid 101 includes for example engagement grooves for holding the engagement projections of the securing surfaces 68 as well as for example a release opening 111 with a safety ramp 112. Around the guide tube 57 extends a spring energy store 122 which is supported at the bottom 69 of the insert sleeve 41 and on a clamping disc 133. Instead of a screw 122 in the form of a compression spring the spring energy store 122 may be in the form of a plate spring packet, an elastomer body, etc. The shown compression spring 122 applies a force to the clamping disc 131, which is supported in the representation of FIG. 16 by the support heads 65 of the flexible webs 61. The clamping disc 131 has for example the same shape as the clamping disc 131 described in connection with the first exemplary embodiment.

FIG. 16 shows a bolt holding device 30 before the insertion of a bolt 20. The spring energy store 122 forms, together with the clamping disc 131, a bolt draw-in arrangement 121. In the state as shown in FIG. 16, the bolt draw-in arrangement 121 is not activated. It is blocked by the flexible webs 61 which form a retaining arrangement 85.

The stop lid 101 restricts the retaining arrangement 85 in a form-locking manner. The retaining arrangement may also be restricted in a force-locking way. The stop lid 101 may also be engaged with the inner wall 52 of the insert sleeve 41 for securing the stop lid 101.

A bolt 20 is inserted into the bolt holding device 30 as described in connection with the first exemplary embodiment. The bolt 20, when being inserted, passes through the clamping disc 131; which is supported by the retaining arrangement 85 and which thereby is pushed onto the bolt 20 while being elastically deformed.

When, upon further insertion of the bolt 29 in the insert direction 31, the bolt 20 abuts the stop lid 101, the stop lid 101 is moved relative to the retaining arrangement 85. The interlocking of the stop lid 101 with the flexible webs 61 as shown in FIG. 16 is released. The stop lid 101 acts as a release element which opens the retaining arrangement 85. The flexible webs 61 return elastically to their original positions. As a result, the bolt draw-in arrangement 121 is released. The spring energy store 122 relaxes and moves the clamping disc 131 in the bolt insertion direction 31. The clamping disc 131 sliding along the support surfaces 66 displaces the support heads 65 additionally outwardly. The bolt 20 is pulled in the bolt insertion direction 31. If the bolt 20 is already seated with its end projection from the bolt holding device 30, the bolt 20 is biased onto its seat.

FIG. 17 shows a bolt holding device 30 with activated stop lid or release element 101, released retaining arrangement 85 and freed bolt draw-in arrangement 121. The bolt is held in the pulled-in position by the spring energy store 122 and the clamping disc 131. The flexible webs are moved into the release openings 111.

With further movement of the stop lid 101 relative to the retaining arrangement 85, the clamping disc 131 moves past the plane defined by the tips 71 of the holding heads 65. This plane extends normal to the longitudinal direction 36. The stop lid 10, which is displaced relative to the flexible webs 61, reaches now with the safety ramps 112 to, the support heads 65 of the flexible webs 61. The support heads 65 are moved toward the center line 32.

FIG. 18 shows the bolt holding device 30 with the flexible webs 61 moved inwardly. The support heads 65 are disposed in this representation between the clamping disc 131 and the spring energy store 122. When now the bolt 20 is pulled in a direction opposite the insert direction 31, the clamping disc 131 abuts the support heads 65. In this way, an elastic deformation of the spring energy store 122 is prevented that is a pull-out prevention is established.

The installation of the bolt holding device 30 in a furniture part 2, 3 and the use of the bolt holding arrangement 30 shown in FIGS. 16-18 is implemented as shown in connection with arrangement described in connection with FIGS. 1-11.

Also, combinations of the various exemplary embodiments are possible.

LISTING OF REFERENCE NUMERALS

| | |
|---|---|
| 1 | Furniture piece |
| 2 | Furniture part |
| 3 | Furniture part |
| 4 | Dead end bore |
| 5 | Wall of the dead end bore |
| 6 | surface |
| 10 | Interconnecting system |
| 20 | Cylinder connecting bolt |
| 21 | Outer surface |
| 30 | Bolt holding device |
| 31 | Bolt insert direction |
| 32 | Center line |
| 33 | Longitudinal direction |
| 41 | Insert sleeve |
| 42 | Back side |
| 43 | Front side |
| 44 | Insert opening |
| 45 | Outer surface |
| 46 | Support section |
| 47 | Guide section |
| 48 | Annular engagement projection |
| 49 | Support surface |
| 51 | Slide surface |
| 52 | Inner wall |
| 53 | Accommodation section |
| 54 | Passage |
| 55 | Spring seat section |
| 56 | Securing section |
| 57 | Guide tube |
| 58 | Outer surface |
| 59 | Transition area |
| 61 | Flexible web |
| 62 | Joint area |
| 63 | O-ring section |
| 64 | Bending section |
| 65 | Support head |
| 66 | Support surface |
| 67 | Slide surface |
| 68 | Securing surface |
| 69 | Bottom |
| 71 | Tips |
| 72 | Wall opening |
| 81 | Retaining and guide element |
| 82 | Support area |
| 83 | Guide area |
| 84 | Support arrangement |
| 85 | Releasing arrangement |
| 86 | Longitudinal bore |
| 87 | Support element |
| 88 | Support bottom |
| 89 | Support bottom |
| 91 | Jacket |
| 92 | Circumferential edge |
| 93 | Holding elements |
| 94 | Opening |

-continued

| | |
|---|---|
| 95 | Pull-out prevention element |
| 96 | Elastic material joint |
| 97 | Longitudinal slot |
| 101 | Stop lid |
| 102 | Outer circumferential area |
| 103 | Annular ring structure |
| 104 | Resting surface |
| 105 | Slide surface |
| 106 | Stop disc |
| 107 | Stop surface |
| 108 | Cone |
| 109 | Outer surface |
| 111 | Release opening |
| 112 | Safety ramp |
| 121 | Bolt draw-in arrangement |
| 122 | Coil spring energy store |
| 131 | Clamping disc |
| 132 | Support ring |
| 133 | Clamping element |
| 141 | Second clamping disc |
| 142 | Holding ring |
| 144 | Support ring |
| 145 | Clamping segments, teeth |
| 151 | Pull-out prevention arrangement |
| 161 | Protective lid |
| 230 | Bolt-holding device |
| 231 | Bolt-holding device |
| 232 | centerline |

What is claimed is:

1. A bolt holding device (30) for mounting a bolt, said bolt holding device comprising:
   an insert sleeve (41) comprising a spring seat section (55), a securing section (56), and a transition area (59) between the spring seat section and the securing section;
   a spring energy store (122) disposed within the spring seat section;
   a retaining arrangement (85) disposed within the insert sleeve opposite the spring energy store, the retaining arrangement (85) comprising at least one pull-out prevention element (95) on an outer periphery thereof;
   a clamping disc (131) disposed within the retaining arrangement, and comprising at least one clamping element (133) on an inner periphery thereof; and
   a stop lid (101), disposed inside the retaining arrangement and supporting the clamping disc (131);
   wherein the bolt holding device (30) is moveable between:
     an unlocked configuration wherein the retaining arrangement (85) is partially within the spring seat section (55) of the insert sleeve (41), and the at least one pull-out prevention element (95) is deflected inward, and
     a locked configuration wherein, when a bolt (20) is inserted into the insert sleeve (41) in a bolt insert direction (31) such that the bolt (20) engages the at least one clamping element (133) of the clamping disc (131), the retaining arrangement (85) is moved into the securing section (56) of the insert sleeve (41) such that when the at least one pull-out prevention element (95) moves past the transition area (59), the pull-out prevention element (95) is allowed to move outwardly, and movement of the bolt (30) in a direction opposite the bolt insert direction (31) is blocked.

2. The bolt holding device of claim 1, wherein the insert sleeve (41) is provided with outer annular engagement projections (48).

3. The bolt holding device according to claim 1, wherein the spring energy store (122) is in contact with the insert sleeve (41) and seated on the retaining arrangement (85} for biasing the retaining arrangement (85) in the bolt insert direction (31).

4. The bolt holding device (30) according to claim 1, wherein the insert sleeve (41) is expandable so that its circumference can be increased by the bolt (20).

5. A mounting system including two bolt holding devices (30, 230) as defined in claim 1, wherein:
   the bolt holding devices (30, 230) are disposed in parts (2, 3) to be joined so that their bolt insert directions (31) are oriented opposite to one another; and
   a cylindrical, threadless bolt (20) with opposing ends is insertable into the two bolt holding devices and fixed therein for joining the parts (2, 3).

6. A furniture piece (1) comprising two parts (2, 3) disposed adjacent each other, wherein the two furniture parts (2, 3) are joined by a mounting system according to claim 5 with a bolt (20) inserted into the two bolt holding devices (30, 230).

* * * * *